United States Patent
Karttunen et al.

(10) Patent No.: US 10,038,850 B2
(45) Date of Patent: Jul. 31, 2018

(54) OPTICAL IMAGE STABILIZATION (OIS) WITH COMPENSATION FOR COMPONENT MISALIGNMENT

(71) Applicant: Texas Instruments Incorporated, Dallas, TX (US)

(72) Inventors: Juha Jorma Sakari Karttunen, Oulu (FI); Jussi Petteri Tikkanen, Haukipudas (FI)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/850,075

(22) Filed: Sep. 10, 2015

(65) Prior Publication Data

US 2016/0088214 A1 Mar. 24, 2016

Related U.S. Application Data

(60) Provisional application No. 62/054,205, filed on Sep. 23, 2014.

(51) Int. Cl.
*H04N 5/232* (2006.01)
*G06T 7/00* (2017.01)

(52) U.S. Cl.
CPC ....... *H04N 5/2328* (2013.01); *H04N 5/23258* (2013.01)

(58) Field of Classification Search
CPC ........... H04N 5/23248–5/2329; H04N 17/002; G03B 2217/005; G03B 2205/0007–2205/0038; G03B 2207/005; G03B 43/00–43/02; G06T 7/20; G06T 7/38; G06T 7/80–7/85; G08B 13/19602; G02B 27/646; G02B 7/003–7/005

USPC ........ 348/208.99, 208.2, 208.16, 37, 333.01, 348/583, 333.06; 702/85, 150, 92, 94, 702/196; 74/5.4, 5 R, 5.8, 5.9; 73/1.75

See application file for complete search history.

(56) References Cited

U.S. PATENT DOCUMENTS

| | | | |
|---|---|---|---|
| 7,509,038 B2 * | 3/2009 | Poon | H04N 5/23248 348/208.4 |
| 7,796,872 B2 * | 9/2010 | Sachs | G03B 17/00 348/208.99 |

(Continued)

*Primary Examiner* — Tuan Ho
*Assistant Examiner* — Marly Camargo
(74) *Attorney, Agent, or Firm* — Andrew Viger; Charles A. Brill; Frank D. Cimino

(57) ABSTRACT

Systems and methods for compensating angular misalignment in Optical Image Stabilization (OIS) systems are described. In some embodiments, a method may include measuring an angle representing a misalignment between an actuator and an electronic component within a camera; and compensating for the misalignment using a rotation matrix, wherein the rotation matrix is calculated based upon the angle. In other embodiments, a camera may include an image sensor coupled to a Printed Circuit Board (PCB); an OIS actuator coupled to the PCB and optically coupled to the image sensor, where the OIS actuator is physically misaligned with respect to the image sensor; and a controller coupled to the PCB, the controller configured to: measure an angle representing the misalignment; and compensate for the misalignment using a rotation matrix at the time of an image capture, where the rotation matrix is calculated based upon the angle.

16 Claims, 3 Drawing Sheets

(56) References Cited

U.S. PATENT DOCUMENTS

| | | | | |
|---|---|---|---|---|
| 8,743,219 B1* | 6/2014 | Bledsoe | ............... | G06T 5/006 |
| | | | | 348/208.4 |
| 2009/0174782 A1* | 7/2009 | Kahn | ............... | G02B 27/646 |
| | | | | 348/208.2 |
| 2009/0219402 A1* | 9/2009 | Schneider | ............ | G03B 17/00 |
| | | | | 348/208.7 |
| 2010/0098394 A1* | 4/2010 | Ishihara | ............. | G02B 27/646 |
| | | | | 396/55 |
| 2010/0245603 A1* | 9/2010 | Hashi | ............... | G03B 5/00 |
| | | | | 348/208.5 |
| 2010/0290769 A1* | 11/2010 | Nasiri | ................ | G03B 17/00 |
| | | | | 396/55 |
| 2012/0019675 A1* | 1/2012 | Brown | ............... | G02B 27/646 |
| | | | | 348/208.2 |
| 2012/0307089 A1* | 12/2012 | Rukes | ............... | H04N 5/232 |
| | | | | 348/208.99 |
| 2014/0085533 A1* | 3/2014 | Celia | ............... | G03B 5/00 |
| | | | | 348/369 |
| 2017/0243374 A1* | 8/2017 | Matsuzawa | ............ | G06T 7/80 |

\* cited by examiner

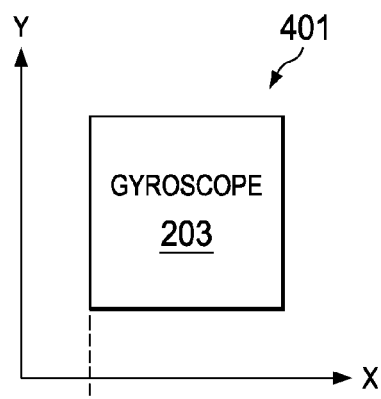
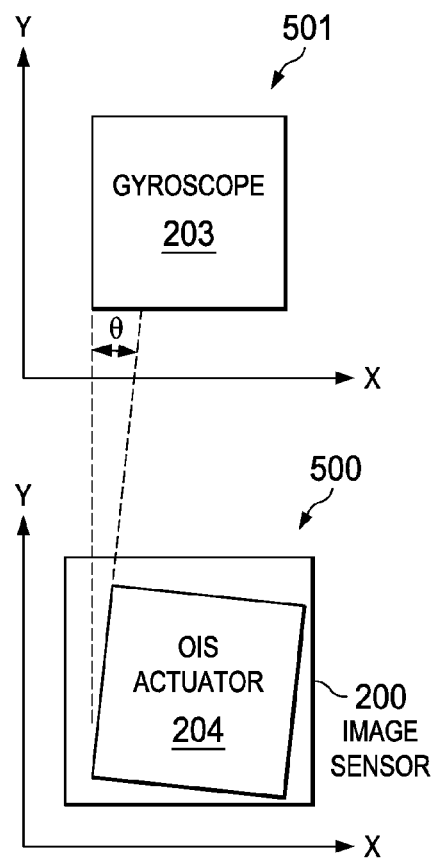
FIG. 4
FIG. 5
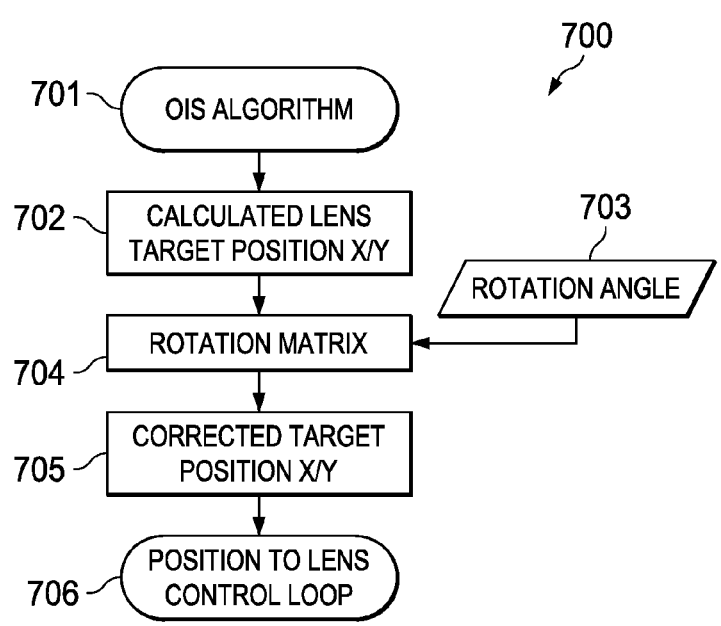
FIG. 7

OPTICAL IMAGE STABILIZATION (OIS) WITH COMPENSATION FOR COMPONENT MISALIGNMENT

CROSS-REFERENCE TO RELATED APPLICATIONS

This application claims priority to U.S. Provisional Patent Application Ser. No. 62/054,205 titled "CALIBRATION AND COMPENSATION METHOD FOR COMPENSATING ACTUATOR ANGULAR MISALIGNMENT IN OPTICAL IMAGE STABILIZATION CAMERA MODULE" and filed on Sep. 23, 2014, which is incorporated by reference herein.

TECHNICAL FIELD

This specification is directed, in general, to image capture and processing, and, more specifically, to systems and methods for compensating angular misalignment in Optical Image Stabilization (OIS) systems.

BACKGROUND

Over the last few years, digital video and still cameras have become more and more sophisticated, thus offering many advanced features. These features include, for example, noise filtering, instant red-eye removal, high-quality images, image and video stabilization, in-camera editing of pictures, wireless transmission of image data, etc.

With respect to image stabilization, technology now exists that attempts to compensate for camera motion when the user is taking a picture or making a recording. Particularly, if the user is trying to record a subject or an event, the user's hand—which is holding the camera—will often inadvertently move or shake at the moment of capture. Image stabilization is intended to counteract these movements, however small they may be, thereby improving the sharpness and overall quality of images produced by the camera.

In that regard, "digital image stabilization" refers to stabilization of the image after it has been captured or recorded. That is, in digital image stabilization, image data already recorded by the camera is then modified electronically or by software after its capture to compensate for hand motion. In contrast, mechanical or Optical Image Stabilization (OIS) refers to the stabilization of physical parts or components (e.g., lens, sensor, etc.) to counteract inadvertent camera movement at the very moment of capture. In optical image stabilization, the camera is equipped with additional electro-mechanical components that aim to compensate for hand motion, camera shake, and other such artifacts as they happen, in or near real-time.

Two main types of OIS include lens-based stabilization systems and sensor-shift stabilization systems. In a lens-based OIS system, one or more parts of the optical lens attached to the camera is moved by an actuator, which compensates for camera movement. Conversely, in a sensor-based OIS system, the imaging sensor is moved by the actuator to perform such compensation.

SUMMARY

Systems and methods for compensating angular misalignment in Optical Image Stabilization (OIS) systems are described. In an illustrative, non-limiting embodiment, a method may include measuring an angle representing a misalignment between an actuator and an electronic component within a camera; and compensating for the misalignment using a rotation matrix, wherein the rotation matrix is calculated based upon the angle.

In some cases, electronic component may include a gyroscope. Additionally or alternatively, the electronic component may include an image sensor optically coupled to the actuator. The actuator may include at least one of: an Optical Image Stabilization (OIS) actuator or an Auto-Focus (AF) actuator. Compensating for the misalignment may include, in connection with an OIS operation, applying the rotation matrix to correct a lens target position at the time of an image capture.

In various implementations, measuring the angle may include moving the actuator to a first position along a given axis; capturing a first image; moving the actuator to a second position along the given axis; capturing a second image; and comparing the second image with the first image. Moreover, comparing the second image with the first image may include: determining a first distance between a pixel in the first image and a corresponding pixel in the second image along the given axis; determining a second distance between the pixel and the corresponding pixel in a direction perpendicular to the given axis; and calculating the angle based upon the first and second distances.

In some embodiments, the angle may be given by $\theta$, the first distance may be given by $d_1$, the second distance may be given by $d_2$, and calculating the angle comprises calculating:

$$\theta = \operatorname{atan}\left(\frac{d_2}{d_1}\right) * 180/\pi.$$

In addition, the rotation matrix (R) may be given by:

$$R = \begin{bmatrix} \cos\theta & -\sin\theta \\ \sin\theta & \cos\theta \end{bmatrix}.$$

In another illustrative, non-limiting embodiment, a camera may include an image sensor coupled to a Printed Circuit Board (PCB); an OIS actuator coupled to the PCB and optically coupled to the image sensor, where the OIS actuator is physically misaligned with respect to the image sensor; and a controller coupled to the PCB, the controller configured to: measure an angle representing the misalignment; and compensate for the misalignment using a rotation matrix at the time of an image capture, where the rotation matrix is calculated based upon the angle.

In yet another illustrative, non-limiting embodiment, a memory device may have program instructions stored thereon that, upon execution by a processor within a camera, cause the camera to: apply a rotation matrix to a lens target position calculated by an OIS controller as part of an OIS operation to result in a corrected lens target position; provide the corrected lens target position to an OIS actuator coupled to lens; and obtain an image from an image sensor optically coupled to the lens, where the corrected lens target position compensates for an angular misalignment between an OIS actuator and a gyroscope.

In some embodiments, one or more imaging devices or computer systems may perform one or more of the techniques described herein. In other embodiments, a tangible computer-readable, electronic storage medium, or memory devices may have program instructions stored thereon that, upon execution by a processor, controller, or computer system, cause the one or more imaging devices or computer systems to execute one or more operations disclosed herein. In yet other embodiments, an imaging or device may include at least one processor and a memory coupled to the at least one processor. Examples of a processor include, but are not limited to, a digital signal processor (DSP), an application specific integrated circuit (ASIC), a system-on-chip (SoC) circuit, a field-programmable gate array (FPGA), a microprocessor, or a microcontroller. The memory may be configured to store program instructions executable by the at least one processor to cause the system to execute one or more operations disclosed herein.

BRIEF DESCRIPTION OF THE DRAWINGS

Figure 1:
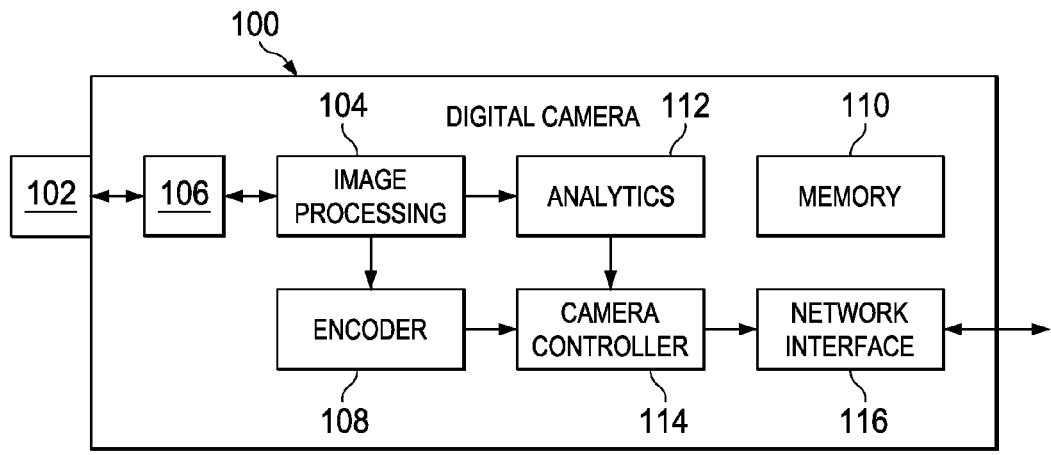

Having thus described the invention(s) in general terms, reference will now be made to the accompanying drawings, wherein:

FIG. 1 is a block diagram of an example of a digital video or still camera configured to implement one or more of the systems and methods described herein according to some embodiments.

Figure 2:
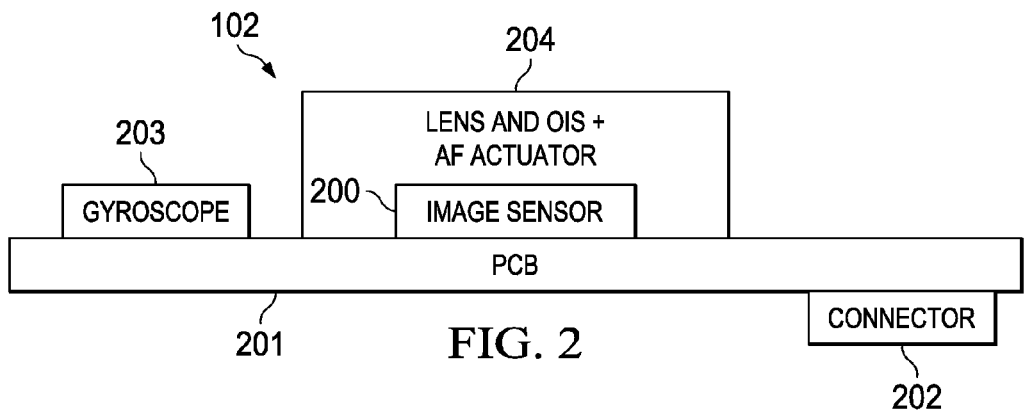
Figure 3:
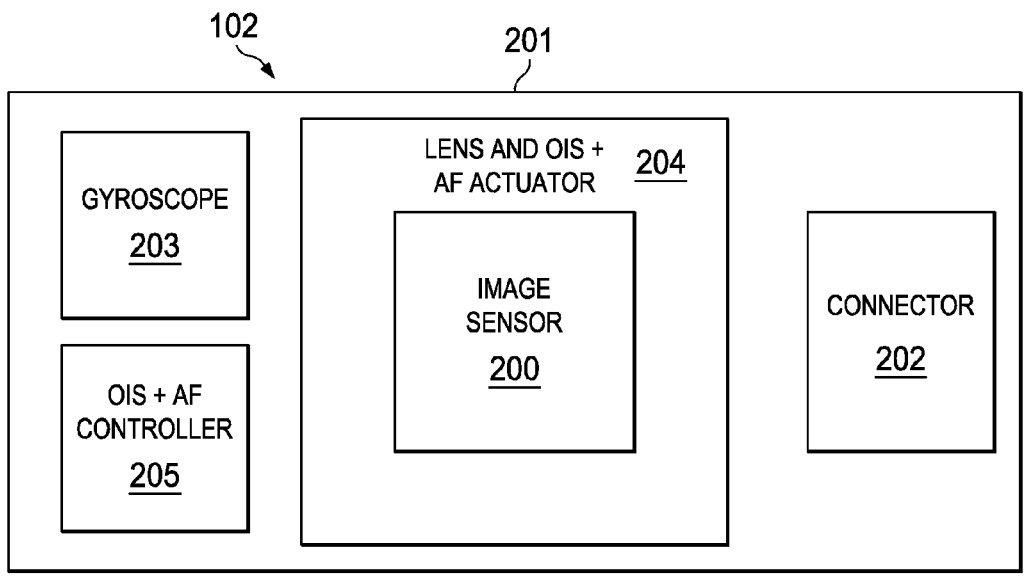

FIGS. 2 and 3 are block diagrams of an example of an imaging component of a digital video or still camera including an Optical Image Stabilization (OIS) system according to some embodiments.

FIGS. 4 and 5 are diagrams illustrating an example of angular misalignment between distinct components of an OIS system according to some embodiments.

Figure 6:
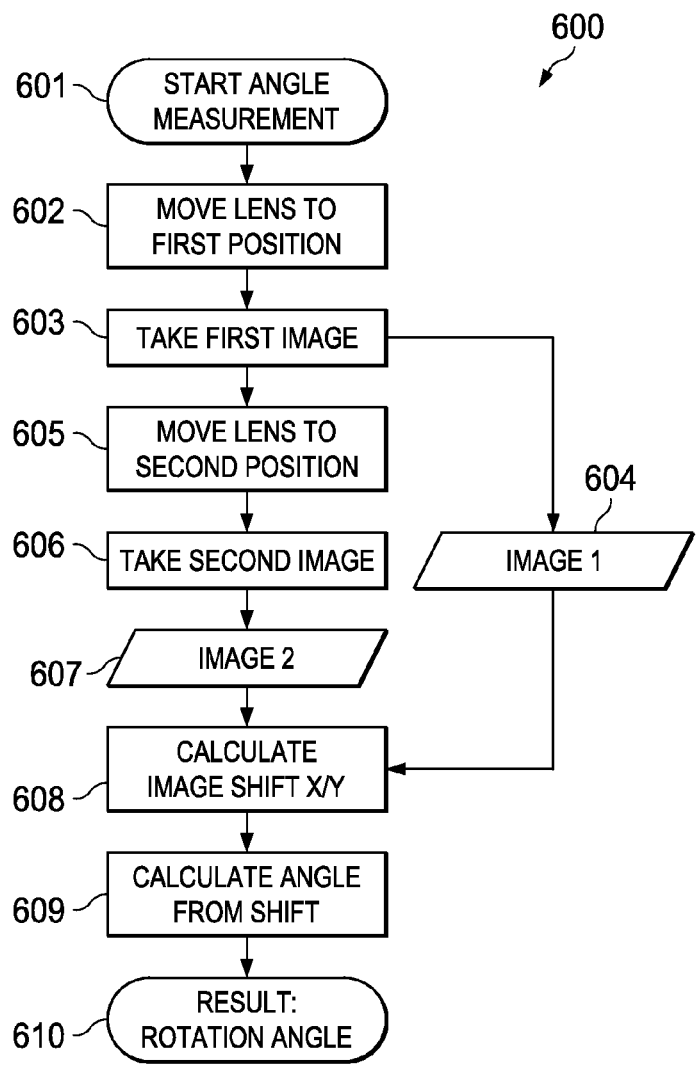

FIGS. 6 and 7 are flowcharts of an example of methods for compensating angular misalignment in an OIS system according to some embodiments.

Figure 8:
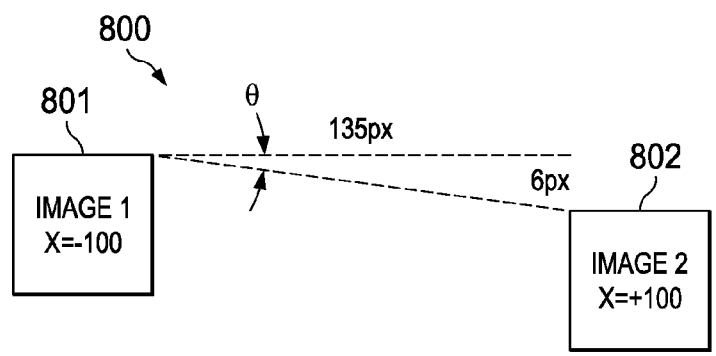

FIG. 8 is a diagram of an example of an angular misalignment calibration procedure according to some embodiments.

DETAILED DESCRIPTION

The invention(s) now will be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

Optical image stabilization (OIS) technology moves a camera's lens or imaging sensor in the opposite direction of the camera's movement (in pitch and yaw) to compensate for camera shake, inadvertent hand movement, and other similar problems. However, if there is an angular misalignment or rotation in placement and/or mechanics of the OIS actuator in comparison to other components, such as a gyroscope or sensor (which often happens during normal manufacturing due to necessary tolerances in component placement, etc.), this causes crosstalk and decreases OIS performance. Errors can occur even with small angular misalignments (e.g., 2°), which can be accentuated further depending upon the orientation of the camera.

To address these and other problems, systems and methods described herein measure the angular shift between camera components based upon acquired images and then compensate the pitch/yaw rotation using a rotation matrix. In various implementations, a method may include taking two images for each axis, moving the lens or sensor along a given axis, and measuring an image shift in pixels between the images. Using these images, the method may then calculate the angular rotation of the OIS actuator. In a perfect manufacturing case with zero angular misalignment, the two images for each axis would move only in a single direction.

Angular rotation data in the form of one or more rotation matrices can be used to compensate the actuator rotational crosstalk for better OIS performance. In a calibration mode of operation, test images may be obtained and the rotation matrix calculated. Then, under normal use with OIS features turned on, the camera may apply the rotation matrix to images produced by the image sensor to correct for the angular misalignment of its various internal parts.

To illustrate the foregoing, FIG. 1 shows a block diagram of an example of digital video or still camera 100 configured to implement one or more of the systems and methods described herein. In some embodiments, digital camera 100 may be a standalone camera. In other embodiments, camera 100 may be embedded in another electronic device such as a mobile phone, a tablet computer, a wearable device such as eyeglasses, a handheld gaming device, etc.

As illustrated here, camera 100 includes imaging component 102, controller component 106, image processing component 104, encoder component 118, memory component 110, analytics component 112, camera controller 114, and network interface 116. The components of the camera 100 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc. Furthermore, software instructions such as software instructions embodying at least part of the pose estimation may be stored in memory in the memory component 110 and executed by one or more processors or controllers.

Imaging component 102 and controller component 106 are configured to capture images of a subject or scene. Particularly, imaging component 102 includes a lens assembly, a lens actuator, an aperture, and an imaging sensor. Imaging component 102 also includes OIS system described in more detail in FIGS. 2 and 3 below, as well as circuitry for controlling various aspects of the camera's operation, such as, for example, aperture opening amount, exposure time, etc. Controller module 106 is configured to convey control information from camera controller 114 to imaging component 102, and to provide digital image signals to image processing component 104.

In the case of a video camera, image processing component 104 divides the incoming digital signals into frames of pixels and processes each frame to enhance the image data in the frame. The processing performed may include one or more image enhancement techniques, such as, for example, one or more of black clamping, fault pixel correction, color filter array (CFA) interpolation, gamma correction, white balancing, color space conversion, edge enhancement, denoising, contrast enhancement, detection of the quality of the lens focus for auto focusing, detection of average scene brightness for auto exposure adjustment, and image stabilization. Digital image from image processing component 104 are provided to encoder component 108 and to analytics component 112.

Encoder component 108 encodes the images in accordance with a still or video compression standard such as, for example, the Joint Photographic Experts Group (JPEG) format, the Tagged Image File Format (TIFF), the Moving Picture Experts Group (MPEG) video compression standards, e.g., MPEG-1, MPEG-2, and MPEG-4, the ITU-T video compressions standards, e.g., H.263 and H.264, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), the ITU-T/ISO High Efficiency Video Coding (HEVC) standard, etc.

Memory component 110 may be an on-chip memory, an external memory, or a combination thereof. Any suitable memory design may be used. For example, memory component 110 may include static random access memory (SRAM), dynamic random access memory (DRAM), synchronous DRAM (SDRAM), read-only memory (ROM), flash memory, a combination thereof, or the like. Various components in digital camera 100 may store information in memory component 110. For example, encoder component 108 may store reference data in a memory of memory component 110 for use in encoding frames in a video stream. Furthermore, the memory component 110 may store any software instructions that are executed by one or more processors or controllers to perform some or all of the described functionality of the various components.

Camera controller component 114 controls the overall functioning of digital camera 100. For example, camera controller component 114 may adjust the focus and/or exposure of the imaging component 102 based on the focus quality and scene brightness, respectively, determined by image processing component 104. Camera controller component 114 also controls the transmission of an encoded video stream via network interface component 116 and may control reception and response to camera control information received via network interface component 116. Further, camera controller component 114 controls the transfer information from analytics component 112 via network interface component 116.

Network interface component 116 allows digital video or still camera 100 to communicate with other devices such as, for example, a computer system or the like. Network interface component 116 may provide an interface for a wired connection—e.g., an Ethernet cable or the like, and/or for a wireless connection. Network interface component 116 may use any suitable network protocol(s).

Analytics component 112 analyzes the content of captured images, and, in the case of video, detects and determine temporal events not based on a given image. The analysis capabilities of analytics component 112 may vary in embodiments depending on such factors as the processing capability of the digital camera 100, the particular application for which the digital camera is being used, etc. For example, the analysis capabilities may range from video motion detection in which motion is detected with respect to a fixed background model to face recognition, object recognition, gesture recognition, feature detection and tracking, etc.

FIGS. 2 and 3 are block diagrams of an example of imaging component 102 including an OIS system according to some embodiments. Particularly, imaging component 102 includes image sensor 200 mounted on Printed Circuit Board (PCB) 201, along with connector 202 used to facilitate electric coupling among various other components. An assembly including an optical lens and an OIS+Auto-Focus (AF) actuator 204 sits above image sensor 200. Both Gyroscope 203 and OIS+AF controller 205 are also mounted on PCB 201 during manufacture.

In the embodiment described here, OIS+AF actuator 204 operates upon optical lens element(s) or assembly in response to signals received at OIS+AF controller 205 from gyroscope 203 in order to compensate for physical movement of the camera. That is, gyroscope 203 detects and measures physical movement of the camera, and, based upon these measurements, controller 205 determines in which direction and by how much the optical lens element needs to be moved in order to compensate for the camera movement at the time of the image capture. In addition, OIS+AF controller 205 also accounts for angular misalignment correction when acting upon OIS+AF actuator 204 during the camera movement compensation process, still at the time of the image capture.

Although illustrated as operating upon one or more lens element(s) and/or assembly, in other embodiments an OIS actuator may instead sit under image sensor 200 (in a sensor-shift stabilization configuration) and it may be configured to move the sensor itself in order to compensate for camera movement. In those cases, OIS portion of actuator 204 may be separate and distinct from the AF portion; the latter of which may continue to operate upon the lens to provide a focused image.

FIGS. 4 and 5 are diagrams illustrating an example of angular misalignment between distinct components of an OIS system according to some embodiments. Graph 400 illustrates the perfect or near perfect alignment between OIS actuator 204 and image sensor 200, with their sides parallel with respect to each other. Similarly, graph 401 shows that gyroscope 203 also is perfectly aligned with respect to OIS actuator 204 and image sensor 200.

In graphs 500 and 501, however, it may be noted that although image sensor 200 and gyroscope 203 are perfectly or near perfectly aligned with respect to each other, OIS actuator 204 is not. Particularly, an angular misalignment measured as angle θ is present between OIS actuator 204 and image sensor 200, as well as gyroscope 203. As previously noted, this misalignment causes "rotational crosstalk" between components and degrades OIS performance.

Gyroscope 203 and image sensor 200 are both mounted on a PCB and their alignment is often acceptable. That is because the PCB is manufactured using photolithography and etching, and a self-alignment process during reflow soldering aligns the gyroscope 203 package to the PCB's footprint. But actuator 204 is a mechanical device which has tolerances in assembly, and at least two kind of errors are possible. First, actuator 204 may be rotated with respect to image sensor 200 or gyroscope 203. Second, the actuator 204's X and Y components may not be perpendicular to each other—e.g., when the actuator 204's X components are parallel to the gyroscope 203's X components, but the actuator 204's Y components are not perpendicular to the gyroscope 203's Y components, but instead they are rotated with respect to each other.

FIGS. 6 and 7 are flowcharts of an example of methods for compensating angular misalignment in an OIS system. In various embodiments, method 600 may be performed as a calibration routine at the time of manufacture and/or at predetermined times during the life of the camera (e.g., during start-up, when a lens is changed, etc.) Conversely, method 700 may be implemented as an image correction algorithm when an image is acquired with OIS features turned on. In various implementations, methods 600 and 700 may be performed, at least in part, by OIS controller 205 of FIG. 3 and/or image processing component 104 of FIG. 1.

At block 601, method 600 starts an angle measurement process. Block 602 includes moving OIS actuator 204 to a first position along a given axis (e.g., X=−127). At block 603, method 600 captures first image 604 while OIS actuator 204 is in the first position. At block 605, method 600 includes moving OIS actuator 204 to a second position along the same axis (e.g., X=127). At block 606, method 600 captures second image 607 while OIS actuator 204 is in the second position. Block 608 calculates an image shift in the X and Y directions, and at block 609, method 600 analyzes the image shift to identify a rotation between them and to calculate the angle. Method 600 ends at block 610, the result of which is the rotation angle θ or a rotation matrix R, as described below.

For example, block 609 may determine a first distance ($d_1$) between a pixel in the first image and a corresponding pixel in the second image along the axis. Block 609 may also determine a second distance ($d_2$) between the pixel and the corresponding pixel in a direction perpendicular to the given axis. Then, block 609 may calculate angle θ based upon the first and second distances as follows:

$$\theta = \operatorname{atan}\left(\frac{d_2}{d_1}\right) * 180/\pi.$$

Finally, block 610 may calculate the rotation matrix (R) as:

$$R = \begin{bmatrix} \cos\theta & -\sin\theta \\ \sin\theta & \cos\theta \end{bmatrix}.$$

Still at block 610, method 600 may store the rotation matrix into a memory such as, for example, a non-volatile memory (NVM) portion of OIS controller 205, thus finishing the calibration procedure. In various implementations, the aforementioned procedure may be performed along a different axis (e.g., Y), and a different rotation matrix R' may be stored for other angular corrections. Additionally or alternatively, two or more matrices may be stored, for example, a first rotation matrix ($R_P$) may be usable to correct images captured while the camera is in a portrait orientation, and a second rotation matrix ($R_L$) may be usable to correct images captured in a landscape orientation.

With respect to method 700, block 701 initiates the OIS algorithm. Block 702 calculates a lens target X-Y position using OIS+AF controller 205. Rotation angle θ and/or matrix R are retrieved at block 703, and are applied to the calculated lens target position at block 704. For example, application of rotation matrix R to the calculated lens target X-Y position of block 702 yields a corrected target X-Y position at block 705 that compensates for the angular misalignment between internal camera components. Block 706 includes using the corrected lens target X-Y position of block 705 (rather than the position calculated in block 702) by OIS actuator 204 to control the position of the lens at the time of the image capture.

To illustrate the foregoing, FIG. 8 shows an example of an angular misalignment calibration procedure following method 600 of FIG. 6. First, a first image ("image 1") is obtained with OIS actuator 204 set to position −100 along the X axis. Thereafter, a second image ("image 2") is obtained with OIS actuator 204 set to position +100. It is then determined that the distance along the X axis between corresponding pixels is 135 pixels in length, and the distance between those same pixels in the Y axis is 6 pixels in length. Accordingly, angle θ is calculated as:

$$\theta = \operatorname{atan}\left(\frac{6}{135}\right) * 180/\pi = 2.5 \text{ degrees.}$$

The rotation matrix R may be calculated using the value found for angle θ, and it may later be used to modify the lens target X-Y position calculated by the OIS system in order to compensate for the angular misalignment at the time of an image capture.

In sum, the systems and methods described herein provide a compensation technique for the angular crosstalk in OIS systems. These techniques may be applied during an otherwise existing module calibration procedure for the actuator sensitivity, using same images, so that it does not add production time. But with this information we can have better OIS performance than without the rotational calibration.

Among the many features discussed herein, are: (a) the measurement of the angular displacement by measuring image shift during module factory calibration, and (b) the compensation of angular displacement in OIS operation by using a rotation matrix (to compensate for angular crosstalk). In various implementations, the rotation matrix may be simplified for small angles (e.g., <5°) by substituting "cosines" with "1" to speed up calculations. Moreover, in some cases the OIS actuator may be instructed to move on single axis (for example, X) without any further movement in another axis (for example, Y) as crosstalk is compensated. These systems and methods may improve OIS performance by about +5 dB (30 dB to 35 dB) when compared to other conventional calibration techniques.

A person of ordinary skill in the art will appreciate that camera 100 and imaging component 102 are merely illustrative and is not intended to limit the scope of the disclosure described herein. In particular, a camera system or device may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other camera configurations.

It will be understood that various operations discussed herein may be executed simultaneously and/or sequentially. It will be further understood that each operation may be performed in any order and may be performed once or repetitiously. In various embodiments, the operations discussed herein may represent sets of software routines, logic functions, and/or data structures that are configured to perform specified operations. Although certain operations may be shown as distinct logical blocks, in some embodiments at least some of these operations may be combined into fewer blocks. Conversely, any given one of the blocks shown herein may be implemented such that its operations may be divided among two or more logical blocks. Moreover, although shown with a particular configuration, in other embodiments these various modules may be rearranged in other suitable ways.

Many of the operations described herein may be implemented in hardware, software, and/or firmware, and/or any combination thereof. When implemented in software, code segments perform the necessary tasks or operations. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc. Software code segments may be stored in any volatile or non-volatile storage device, such as a hard drive, flash memory, solid state memory, optical disk, CD, DVD, computer program product, or other memory device, that provides tangible computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:

1. A method useable in a camera with a lens module, comprising:
in a calibration mode, determining a misalignment angle representing a misalignment between an actuator and an electronic component of the lens module, by
moving the actuator to a first position along a first axis;
capturing a first image;
moving the actuator to a second position along the first axis;
capturing a second image; and
determining the misalignment angle, by
determining a first distance between a pixel in the first image and a corresponding pixel in the second image along the first axis;
determining a second distance between the pixel and the corresponding pixel in a direction along a second axis perpendicular to the first axis; and
determining the misalignment angle based upon the first and second distances; and
in an image capture mode, compensating for the misalignment during image capture using the misalignment angle.

2. The method of claim 1, wherein the electronic component is one of: a gyroscope or an image sensor.

3. The method of claim 1, further comprising:
determining a rotation matrix based upon the misalignment angle; and
compensating for the misalignment using the rotation matrix.

4. The method of claim 3, wherein the actuator comprises at least one of: an Optical Image Stabilization (OIS) actuator or an Auto-Focus (AF) actuator.

5. The method of claim 3, wherein compensating for the misalignment comprises, in connection with an Optical Image Stabilization (OIS) operation, applying the misalignment angle to correct a lens target position at the time of an image capture.

6. The method of claim 1, wherein the misalignment angle is given $\theta$, the first distance is given by $d_1$, the second distance is given by $d_2$, and calculating the angle comprises calculating:

$$\theta = \mathrm{atan}\left(\frac{d_2}{d_1}\right)*180/\pi.$$

7. The method of claim 3, wherein the misalignment angle is given $\theta$, and the rotation matrix (R) is given by:

$$R = \begin{bmatrix} \cos\theta & -\sin\theta \\ \sin\theta & \cos\theta \end{bmatrix}.$$

8. A camera comprising:
a lens module, including:
a lens;
an image sensor optically coupled to the lens;
an Optical Image Stabilization (OIS) actuator mechanically coupled to the lens, wherein the OIS actuator is physically misaligned with respect to the image sensor; and
a controller coupled to OIS actuator, the controller operable in a calibration mode:
to determine a misalignment angle representing the misalignment, by:
moving the OIS actuator to a first position along a first axis;
capturing a first image;
moving the OIS actuator to a second position along the first axis;
capturing a second image; and
determining the misalignment angle by:
determining a first distance between a pixel in the first image and a corresponding pixel in the second image along the first axis;
determining a second distance between the pixel and the corresponding pixel in a direction along a second axis perpendicular to the first axis; and
determining the misalignment angle based upon the first and second distances; and
the controller operable in an image capture mode to compensate for the misalignment during image capture using the misalignment angle.

9. The camera of claim 8, wherein, the controller is further operable in the image capture mode to apply the misalignment angle to correct a lens target position calculated by the controller.

10. The camera of claim 8, wherein the misalignment angle is given by $\theta$, the first distance is given by $d_1$, the second distance is given by $d_2$, and the controller is configured to calculate:

$$\theta = \mathrm{atan}\left(\frac{d_2}{d_1}\right)*180/\pi.$$

11. The camera of claim 8, wherein the controller is further operable in the calibration mode to determine a rotation matrix based on the misalignment angle, the misalignment angle given θ, and the rotation matrix (R) is given by:

$$R = \begin{bmatrix} \cos\theta & -\sin\theta \\ \sin\theta & \cos\theta \end{bmatrix}$$

and
the controller is further operable in the image capture mode to compensate for the misalignment using the rotation matrix.

12. A lens module for use in a camera, the lens module comprising:
a lens;
a gyroscope;
an image sensor optically coupled to the lens;
an Optical Image Stabilization (OIS) actuator mechanically coupled to the lens, wherein the OIS actuator is physically misaligned with respect to a component of the lens module; and
a controller coupled to the gyroscope and the OIS actuator, and operable in a calibration mode:
to determine a misalignment angle representing the misalignment, by:
moving the OIS actuator to a first position along a first axis;
capturing a first image;
moving the OIS actuator to a second position along the first axis;
capturing a second image; and
determining the misalignment angle by:
determining a first distance between a pixel in the first image and a corresponding pixel in the second image along the first axis;
determining a second distance between the pixel and the corresponding pixel in a direction along a second axis perpendicular to the first axis; and
determining the misalignment angle based upon the first and second distances; and
the controller operable in an image capture mode to compensate for the misalignment during image capture using the misalignment angle.

13. The lens module of claim 12, wherein the misalignment is a misalignment between the OIS actuator and the image sensor.

14. The lens module of claim 12, wherein the controller is further operable in the image capture mode to apply the misalignment angle to correct a lens target position calculated by the controller.

15. The lens module of claim 12, wherein the misalignment angle is given by θ, the first distance is given by $d_1$, the second distance is given by $d_2$, and the controller is configured to calculate:

$$\theta = \operatorname{atan}\left(\frac{d_2}{d_1}\right) * 180/\pi.$$

16. The lens module of claim 12, wherein the controller is further operable in the calibration mode to determine a rotation matrix based on the misalignment angle, the misalignment angle given θ, and the rotation matrix (R) is given by:

$$R = \begin{bmatrix} \cos\theta & -\sin\theta \\ \sin\theta & \cos\theta \end{bmatrix}$$

and
the controller is further operable in the image capture mode to compensate for the misalignment using the rotation matrix.

* * * * *